Patented Sept. 6, 1927.

1,641,771

UNITED STATES PATENT OFFICE.

LUDOLF MEILER AND HEINRICH SCHOLLER, OF MUNICH, GERMANY.

PROCESS FOR THE PRODUCTION OF GLUCOSE FROM MATERIALS CONTAINING CELLULOSE.

No Drawing. Application filed September 10, 1924, Serial No. 736,920, and in Germany March 26, 1921.

Our invention relates to the production of glucose from materials containing cellulose and refers particularly to the production of crystallized glucose from wood and other materials containing non-cellulose matters.

The production of glucose from wood is known, but these processes have been found to be incapable of commercial adoption because of the difficulties incident to the steps of production.

In the known processes for the production of glucose from wood, and similar substances, a considerable amount of non-cellulose material is dissolved, preventing the crystallization of the glucose and hence resulting in impure final products.

Further, in the known processes, the intermediate products are produced in a form which is extremely difficult to filter and as during this process of filtration the dextrine is partly decomposed into water soluble compounds, the processes present difficulties which prevent their commercial application.

We have overcome the above and other difficulties and objections incident to the present known processes, our process presenting a means for the production of crystallized glucose from impure cellulose materials in an economical, efficient and commercially practical manner.

We have found that, if impure cellulose materials, such as wood, be moistened with a mineral acid and then submitted to the action of acid gas under pressure at low temperatures, there is produced a solution of cellulose. The solution of cellulose thus produced is difficult to filter from the insoluble non-cellulose materials in the condition thus formed, the length of time necessary for such filtration resulting in the production of objectionable water-soluble dextrine products, interferring with the production of pure glucose and contaminating the final result.

We have found that this difficultly-filterable mixture can be converted into one which is easily filtered and from which the non-cellulose materials may be readily and rapidly separated from the dissolved cellulose without the formation of water soluble dextrine products, or with an extremely small percentage thereof. We have found that this highly desirable condition can be obtained by diluting the original mixture with water, or dilute acid, without precipitating the dissolved materials contained therein.

We have further found that the cellulose dextrine contained in the solution resulting from the above filtration can be precipitated by adding water, or dilute acid, thereto.

We have further found that the products thus obtained may be converted into glucose by weak acid, this saccharification being produced by acid very considerably weaker than that necessary for the conversion of starch into glucose.

It will thus be seen that the process of our invention comprises new methods for the production of glucose from impure cellulose materials and that it overcomes many objectionable features incident to the previously known methods and that our process allows of the production of glucose from materials not previously of practical application for that purpose.

As it is desirable to produce a concentrated solution of cellulose, we prefer to moisten the impure cellulose material, as, for instance, wood, with concentrated hydrochloric acid and then treat it with hydrochloric acid gas under pressure. The action of the hydrochloric acid gas increases the dissolving effect of the acid, which takes place at low temperatures. In the following of our process, we prefer that the temperature at this point should not exceed 10° C., as higher temperatures cause a decomposition of the cellulose with the formation of water soluble compounds, resulting in decreased yields. For this reason, we also prefer to employ cooled hydrochloric acid, in order to prevent an undesirable increase in temperature. We prefer to have a pressure of about ¼ atmosphere, although this pressure may be increased if strong agitation is employed during the dissolving process.

At the end of this step of our process, the greater part of the non-cellulose material is undissolved and is in suspension in the solution.

It is extremely difficult to separate the non-cellulose materials from the dissolved substances and, during the long filtering operation, the dextrine is decomposed into objectionable water-soluble materials. We convert this mixture, which is difficult to filter, to one which is readily filtered, with corresponding reduction in the production of undesirable dextrine decompositions, by reducing its concentration by the addition of water, or dilute hydrochloric acid, without precipitating the dissolved compounds. We find that the reduction of concentration to about 30% acid is usually effective.

The soluble matters are now filtered from the insoluble ones and the filtrate diluted by water, or weak acid, causing a precipitation of the glucose producing bodies, or the cellulose dextrines.

The cellulose dextrines are now freed from acid as far as possible, which is usually possible to a 0.1% acid content and a 20% suspension of the cellulose dextrine is employed for saccharification.

We have found that this dextrine can be saccharified with an unexpected weak solution of hydrochloric acid, which is much weaker than that necessary in the conversion of starch into glucose. For this saccharification we have employed an acid concentration of 0.1% and have obtained a yield of 80% in 30 minutes at a temperature of 170° C.

The solution is then filtered, decolorized, neutralized with soda-ash, concentrated and crystallized.

As an example of our process, we give the following:

One part of dry sawdust is moistened with two parts of cooled concentrated hydrochloric acid. Hydrochloric acid gas is then passed into the well stirred mixture at ¼ atmosphere pressure, the temperature not being allowed to exceed 10° C. When the viscous mass has been converted into a thin suspension, which usually occurs in about 20 minutes, the suspension is diluted with water, or weak hydrochloric acid, without precipitation and filtered. The filtrate is diluted with an equal quantity of water, whereupon the cellulose dextrine precipitates. The dextrine is separated as completely as possible from the acid and diluted with water to produce a 20% suspension. The content of hydrochloric acid is reduced to 0.1% by washing and the mixture heated for 30 minutes to 170° C. The produced glucose solution is filtered, decolorized, concentrated and crystallized.

We do not limit ourselves to the particular chemicals, quantities, times, temperatures, pressures, or steps of procedure mentioned above, as these are given simply to clearly describe the process of our invention.

What we claim is:—

1. The process of producing glucose from cellulose-containing material, which comprises treating the material with a mineral acid, treating the resulting mixture to the influence of mineral acid gas under pressure, diluting the resulting mixture without precipitation, separating the undissolved materials from the soluble ones, diluting the solution causing a precipitation, separating the precipitated materials from the solution, treating the precipitated materials to form glucose and separating the glucose from the solution.

2. The process of producing glucose from cellulose-containing material, which comprises treating the material with hydrochloric acid, submitting the resulting mixture to the action of hydrochloric acid gas under pressure, diluting the resulting mixture without causing a precipitation, filtering the insoluble matters from the soluble ones, diluting the filtrate causing the formation of a precipitate, filtering the mixture, saccharificating the filtered precipitate forming glucose and recovering the glucose from the solution.

3. The process of producing glucose from wood, which comprises treating the wood with strong mineral acid, subjecting the resulting products to the action of the mineral acid gas under pressure, diluting the resulting mixture without forming a precipitate, filtering, diluting the filtrate forming a precipitate, filtering, saccharifying the residue forming glucose and recovering the glucose from the solution.

4. The process of producing glucose from cellulose-containing material, which comprises treating the material with hydrochloric acid, submitting the resulting mixture to the action of hydrochloric acid gas under pressure at not exceeding 10° C. temperature, diluting the resulting mixture without causing a precipitation, filtering the insoluble matters from the soluble ones, diluting the filtrate causing the formation of a precipitate, filtering the mixture, saccharificating the filtered precipitate forming glucose and recovering the glucose from the solution.

5. The process of producing glucose from cellulose-containing material, which comprises treating the material with hydrochloric acid, submitting the resulting mixture to the action of hydrochloric acid gas under pressure at not exceeding 10° C. temperature, diluting the resulting mixture without causing a precipitation, filtering the insoluble matters from the soluble ones, diluting the filtrate causing the formation of a precipitate, filtering the mixture, saccharificating the filtered precipitate by means of weak hydrochloric acid forming glucose and recovering the glucose from the solution.

6. In the process of producing glucose from cellulose-containing material, the steps which comprise treating the material with a mineral acid and then treating the resulting mixture with a mineral acid gas under pressure forming a concentrated solution of cellulose without the formation of appreciable quantities of water-soluble cellulose decomposition products.

7. In the process of producing glucose from cellulose-containing material, the steps which comprise treating the material with hydrochloric acid and then treating the resulting mixture with hydrochloric acid gas under pressure forming a concentrated solution of cellulose without the formation of appreciable quantities of water-soluble cellulose decomposition products.

8. In the process of producing glucose from cellulose-containing material, the steps which comprise treating the material with hydrochloric acid and then treating the resulting mixture with hydrochloric acid gas under pressure at a temperature not exceeding 10° C. forming a concentrated solution of cellulose.

9. In the process of producing glucose from cellulose-containing material, the steps which comprise producing a solution of cellulose and diluting the solution of cellulose without the formation of appreciable quantities of water-soluble cellulose decomposition products without forming a precipitate.

10. In the process of producing glucose from cellulose-containing material, the steps which comprise producing an acid solution of cellulose containing non-soluble matters, diluting the mixture without forming a precipitate and separating the non-soluble matters from the soluble matters.

11. In the process of producing glucose from cellulose-containing material, the steps which comprise converting the cellulose into water-precipitatable cellulose dextrine and saccharifying the dextrine.

12. In the process of producing glucose from cellulose-containing material, the steps which comprise converting the cellulose into water-precipitatable cellulose dextrine and saccharifying the dextrine by means of weak acid.

Signed at Munich, Germany, this 25 day of August, 1924.

LUDOLF MEILER.
HEINRICH SCHOLLER.